（12） United States Patent
Gim et al.

(10) Patent No.: US 7,605,964 B2
(45) Date of Patent: Oct. 20, 2009

(54) ARRAY OF MICROMIRRORS WITH NON-FIXED UNDERLYING STRUCTURES

(75) Inventors: Dong Woo Gim, Gyoungnam (KR); Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 39 days.

(21) Appl. No.: 11/693,698

(22) Filed: Mar. 29, 2007

(65) Prior Publication Data
US 2008/0239442 A1 Oct. 2, 2008

(51) Int. Cl.
*G02B 26/08* (2006.01)
(52) U.S. Cl. ............................. 359/223; 359/291
(58) Field of Classification Search ......... 359/618–626, 359/220–224, 291
See application file for complete search history.

(56) References Cited
U.S. PATENT DOCUMENTS

| | | | | |
|---|---|---|---|---|
| 6,025,951 A | * | 2/2000 | Swart et al. | 359/245 |
| 2006/0238852 A1 | * | 10/2006 | Strumpell | 359/291 |
| 2007/0195439 A1 | * | 8/2007 | DeNatale et al. | 359/871 |

* cited by examiner

*Primary Examiner*—Scott J Sugarman
*Assistant Examiner*—Vipin M Patel

(57) ABSTRACT

The present invention discloses an array of micromirrors with non-fixed underlying structures which can be oriented to have principal rotational axis with no structural and mechanical interference and with no electrical conflict. The micromirror array in the present invention can reproduce various surfaces including spherical, aspherical (e.g. parabolic, hyperbolic, elliptical, etc.), anamorphic, other than rotational symmetric profiles. With the newly introduced non-fixed underlying structure, the present invention makes possible for a micromirror array to generate a desired optical surface profile by simple motion controls and to improve structural stability, simplicity, flexibility, and efficiency in motion and motion control.

23 Claims, 12 Drawing Sheets

81

81

ARRAY OF MICROMIRRORS WITH NON-FIXED UNDERLYING STRUCTURES

FIELD OF INVENTION

The present invention relates to array of micromirrors. Particularly, the invention relates to array of micromirrors with non-fixed underlying structures so that each micromirror has differently oriented the underlying structure.

BACKGROUND OF THE INVENTION

There have been micromirror structures to improve optical efficiency and motion efficiency with concealed underneath structure and appropriate flexure structure as in U.S. Pat. No. 6,028,689 to Michalicek, U.S. Pat. No. 6,906,848 to Aubuchon. The U.S. patent application Ser. No. 11/463,875 by Gim et al. also provides the other micromirror structure and design with more efficient motion and higher optical efficiency.

Since those micromirror structures are developed to have multi-axis rotation and translation motions, they require much complicated underneath structures to generate and control the required motions. Because of the complicated structure with more layers, more cost has to be paid for production. Even when those micromirror structures are arranged in an array, the prior art requires much complicated control methods to generate multi-axis rotation and translation, and they have small motion coverage because the system must be designed for any micromirror to cover full range of required motion.

Differently from the prior art having disadvantages and weaknesses of complicated structure and smaller motion coverage, the present invention has a lot of advantages such as low cost and structural stability thanks to the simplified structure, bigger motion coverage, and high efficiency in the micromirror motion and motion control.

The present invention contrives to solve the disadvantages of the conventional micromirrors with multi-axis rotational and translational motion.

The objective of the present invention is to provide a new structure for micromirror and the array of those micromirrors. The present invention also extends its advantages to the applications of the micromirror array which are disclosed in U.S. Pat. No. 6,396,619 to Huibers and U.S. Pat. No. 6,389,190 to Solgaard and Micromirror Array Lens, which is disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 09, 2007 to Kim, U.S. Pat. No. 6,999,226 issued Feb. 14, 2006 to Kim, U.S. Pat. No. 7,095,548 issued Aug. 22, 2006 to Cho, U.S. patent application Ser. No. 10/893,039 filed Jul. 16, 2004, U.S. patent application Ser. No. 10/983,353 filed Nov. 8, 2004, U.S. patent application Ser. No. 11/076,616 filed Mar. 10, 2005 and U.S. patent application Ser. No. 11/426,565 filed Jun. 26, 2006, all of which are incorporated herein by references.

With the newly introduced non-fixed underlying structure, the present invention makes possible for a micromirror array to have the same required optical surface profile by simple motion controls as that by complicated structure for multi-degrees of freedom motion, and improves structural stability, simplicity, flexibility, and efficiency in motion.

Generally, each micromirror of micromirror array must have multi-degrees of freedom motion to generate an arbitrary optical surface profile. When each micromirror has the same underlying structure and its orientation, each micromirror must have two degrees of freedom rotational and one degree of freedom translational motion in order to generate a desired optical surface profile. Moreover, to make an active light modulator to have variable focusing properties of Micromirror Array Lens, the micromirror array should generate multiple different motions with different surface profiles for corresponding light modulating properties or corresponding focal lengths for the Micromirror Array Lens. Thus, complicated underlying structure and control system should be present to have general motions with proper amount of translational and rotational coverage.

The basic idea of the present invention is to reduce this complexity. The complex motions with two degrees of freedom rotational and one degrees of freedom translational motion can be reduced simple one degree of rotational motion with proper arrangement of the underlying structures for motion generation. One additional degree of freedom translational motion optionally needed for general motion coverage.

According to Euler's Principal Rotation Theorem, any desired orientation can be simplified with one principal rotation of principal rotation angle. If this theorem is applied, multi-degrees of freedom rotational motion can be achieved by single principal rotation with provision of the proper structure arrangement. The motion generation structure should be arranged along the principal axis to have reduced degree of freedom motions.

In other words, the micromirror structure with one degree of freedom rotational motion optionally with degree of freedom translational motion can generate the desired motions with multi-degrees of freedom motion. It can be achieved with non-fixed underlying structure by arranging motion generation structures of each micromirror in the micromirror array to have single rotational motion about the principal axis and designing the underlying structure to generate and characterize one degree of freedom rotational motion optionally with one degree of freedom translational motion. Then, the structure of the micromirror array can be simplified and have effective usage with higher motion coverage and simple control system.

Also the micromirror array with non-fixed underlying structure can have simple control system. Even though the micromirrors in the array have different principal axes and different principal rotation angle. One common input signal can activate all the micromirrors in the array with different motions of rotation and translation even with different degrees of freedom. The present invention of the micromirror array with non-fixed underlying structure has simple control system and simple control method.

Thanks to the simplified and effective motion coverage of the micromirrors, the micromirror array can have reduced operational voltages. Since the structure is simplified, the gap between the electrodes for generating the operational force is reduced. So the operational voltage id considerably reduced.

The advantages of the present invention are not limited by the structure and system. Since the structures of the micromirror are simplified, fabrication process is reduced to simple. While making MEMS devices, the fabrication process is directly related to the yield rate. The present invention gives higher yield rate to fabrication since the structures and the fabrication processes are simpler than the micromirrors with fixed arrangement. The reduced processes for fabrication and higher yield produce higher cost effective devices.

The micromirror array with non-fixed underlying structure has many advantages such as much simpler motion generation structures, simple control system, simple control

SUMMARY OF THE INVENTION

The micromirror array with non-fixed underlying structures of the present invention comprises a plurality of micromirrors. Each micromirror in the micromirror array with non-fixed underlying structures comprises a bottom layer having control circuitry, a micromirror having a top side and a bottom side, wherein the top side has a reflective surface and underlying structures for providing actuation force and restoration force for motion of the micromirror and generating the micromirror motions.

The underlying structures are aligned with a principal rotation of the micromirror motion. The underlying structures comprise at least one bottom electrode to provide electrostatic actuation force, at least one flexible structure to provide restoration force for the micromirror, at least one post structure connecting and supporting the underlying structures and the micromirror.

The underlying structures of each micromirror is individually oriented and aligned to generate a single principal rotational motion for forming a desired surface profile. The non-fixed underlying structure also can change its orientation within the unit cell without any structural/mechanical interference and electrical conflict.

Even with the same in-plane shape of underlying structure to provide actuation force and even with the common voltage input, different micromirrors at different positions in the array can generate different motions depending on the orientation of underlying structure, shapes of actuating electrodes, control circuitry, and/or shapes of supports. The underlying structure has to be oriented along with pre-determined principal axis for the micromirror from the desired optical surface profile.

It is sure that the micromirror also can be changed its orientation if needed. However, it is better for the micromirror itself to keep its orientation because the optical performance of the micromirror array is strongly dependent on the arrangement of micromirrors. As the micromirror is arranged to maximize the optical performance such as fill factor and the underlying structure is placed to generate the single principal rotational motion, the micromirror array has much simpler structure and improves structural stability, simplicity, flexibility, and efficiency in motion The micromirrors in the micromirror array with non-fixed underlying structures have two degrees of freedom rotational motion described by the single principal rotational motion and orientation of the underlying structures with the micromirror. The micromirrors in the micromirror array with non-fixed underlying structures have two degrees of freedom rotational motion and on degree of freedom translational motion described by the single principal rotational motion, orientation of the underlying structures with the micromirror, and translational motion of the micromirror. In order to generate a desired optical surface profile, each micromirror has to cover full motional range of the surface profile with multi-degrees of freedom motion. To do this, the micromirror structure becomes complicated. However, by applying constrained motional properties about the principal axis, the present invention can have more motional coverage with the same structural dimension, improve stability, and provide stable motion control by applying those structural advantages to the design.

Each micromirror in the micromirror array with non-fixed underlying structures individually generates a micromirror motion with translation and a single principal rotation. With the simple structure, the micromirrors in the array surely can be controlled independently. Even a group of micromirrors also can be controlled by the shared control circuitry. With a common control input for the group of micromirrors, each micromirror can generate its own desired motion which is different from others. The present invention improves control system with more efficiency.

Each micromirror in the micromirror array with non-fixed underlying structures is individually controlled. The micromirror in the micromirror array is independently controlled to form at least one optical surface profile. Also the micromirrors in the micromirror array are controlled by a common input signal to the electrodes to form an optical surface profile.

The micromirror is actuated by actuation force provided by the bottom electrode. The actuation force acts on the micromirror itself or top electrode plate. By introducing one or more top electrode plates as an actuation layer, the bottom electrodes on the substrate pull the top electrode rather than the micromirror layer itself. By introducing the top electrode, the acting gap of the electrostatic force is considerably reduced. Since the actuation force is electrostatic force (capacitive force), the gap between the electrodes is very important for evaluation of the actuation force. The reduced gap of the present invention increases the electrostatic force and also increases motion efficiency of the micromirror device.

The micromirror structure has a reflective surface to increase the reflectivity of the micromirror. The reflective surface of the micromirror structure is substantially flat. In some cases, the reflective surface of the micromirror structure preferably has a curvature in order to enhance the optical properties of the surface profile of the micromirror or micromirror array. Also the curvature of the micromirror structure is controlled for enhancing the optical properties of the micromirror or micromirror array. The curvature of the micromirror structure is controlled by electrothermal force.

The reflective surface has a layer or layers to have high reflectivity. The reflective surface layer is made of metal or metal compound. The reflective surface layer is also made of multi-layered dielectric materials. The reflective surface layers are made of metal and dielectric material to enhance the reflectivity of the micromirror.

The reflective surface of each micromirror has a high reflectivity provided by a metal layer. The metal layer is made of a material selected from the group consisting of silver (Ag), aluminum (Al), gold (Au), nickel (Ni), chromium (Cr), and platinum (Pt) to have high reflectivity. The metal layer is protected by additional coating layer deposited on the metal layer with a material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), calcium fluoride ($CaF_2$), zinc sulfide (ZnS), zinc selenide (ZnSe), polycarbonate, polyester, polyethylene naphthalate, and fluoropolymer. The reflectivity of the metal layer is enhanced by dielectric coating layers. Also the reflective surface of each micromirror has a high reflectivity provided by dielectric layers.

To properly control the micromirror or micromirror array, the micromirror has control circuitry to supply the electrical power to the electrodes. The control circuitry selectively supplies electric power to the corresponding electrodes to have desired motion of the micromirror or micromirror array. The control circuitry can be constructed by using semiconductor microelectronics technologies such as MOS or CMOS.

Depending on the applications and geometry, the micromirror has a fan, rectangular, square, hexagonal, or triangular shape. The shape of the micromirror is determined on the basis of the efficiency of micromirror motion, the system geometry, fill factor of the system, and so on.

To have restoring force of the micromirror motion, a structure with elastic force should be introduced. In the present invention, a flexible structure provides a restoring force for micromirror motions and also connects top electrode (or micromirror itself) and the pillar structure which supports the micromirror structure from the substrate through the flexible structure. The flexible structure can be a kind of micro structured spring and gives restoration force to the micromirror motions. The flexible structure can be located in the same layer with the top electrode plate.

The top electrode plate can further comprise a post in different layer to connect the top electrode plate and the flexible structure. The flexible structure is located between the top electrode plate and the micromirror structure. The flexible structure between the top electrode and the micromirror structure has two major advantages in design and operation of the micromirror device. Since the flexible structure is not located in the same layer with the top electrode plate, the top electrode area can be maximized to have stronger electrostatic force. The flexible structure also has more flexibility thanks to the large area for the effective spring.

For the precise control of micromirror motion, the flexible structure must be designed to have an appropriate rotational and translational stiffness. In order to have the desired structure with sufficient stiffness, the flexible structure should be varied in its shape and size. Thanks to the increased area for the flexible structure in its own layer, the micromirror device has higher efficiency of the motion and can also be operated at lower operating voltage.

Another embodiment uses one or more top electrode plates as an actuation layer, not a micromirror layer itself. Since the actuation force mainly depends on the gap and the area of two electrodes with different potential, the present invention has an advantage of the reduced gap between bottom and top electrodes and also the expanded size of electrodes. The present invention needs much smaller voltage input thanks to the improved design and smaller gap between substrate and top electrode plate.

For the case of other micromirror devices with the structure of attracting the micromirror itself, it is difficult to modify the micromirror design. Even the smallest change in the micromirror device gives a large difference to the operational condition. But in the present invention, the top electrode plate gives the flexibility in the structural variations without any change on the micromirror structure. The influence by the modification is separated into two parts, i.e., the structures below the top electrode and the structures above the top electrode. The modification in one side cannot make change in the other side.

The top electrode plate and the micromirror structure are connected by a post structure. Since the top electrode and the micromirror structure are just like two-layered structure, they have a strong resistance to the deformation of the structures. The post structure connecting the micromirror structure and the top electrode prevents deformation of the micromirror structure. The micromirror device can have multiple post structures connecting the top electrode plate and the micromirror structure to prevent deformation of the micromirror structure. While design optimization process in design, more posts can be located where the deformation of the micromirror is severe. The multiple post structure also gives firm attachment between the top electrode and micromirror structure thus provides motion stability of the micromirror device thanks to the strong attachment between the micromirror structure and the top electrode plate. The strong attachment between the micromirror structure and the top electrode plate must be present since the top electrode is the actually attracted part by the electrostatic force and the micromirror structure is the structure to be attracted for operation.

Also the design modification of the micromirror device can easily be applied. No matter how big modification on the micromirror structure or on the structure above the top electrode is applied, there is no difference in applied voltage and actuation force because the attraction force is mainly determined by the potential difference and the gap between the bottom and top electrodes. Without increasing the operational voltage or decreasing the electrostatic force, additional structures can easily be added.

The underlying structures further comprise at least one stepper plate disposed between the micromirror and the bottom layer, wherein the stepper plate defines the motion of the micromirror. Each stepper plate has at least one support structure wherein the motion of the micromirror is pre-programmed by positions of the stepper plate and the supports. The detail motion generation using stepper plate and support structures is described in U.S. patent application Ser. No. 10/872,241 filed Jun. 18, 2004, U.S. patent application Ser. No. 11/072,597 filed Mar. 4, 2005, U.S. patent application Ser. No. 11/369,797 filed Mar. 6, 2006 and U.S. patent application Ser. No. 11/685,119 filed Mar. 12, 2007 all of which are incorporated herein by references.

While the micromirror device can be used as a single micromirror device itself, a micromirror array can be built comprising a plurality of micromirror devices said with side-by-side arrangement. If the micromirror device is used as an array, the array has various functions and a large variety in utility areas.

The micromirror devices in the micromirror array are controlled independently with proper control circuitry in the substrate. Also the micromirror devices in the micromirror array can be controlled by a common input signal to form an optical surface profile. By controlling the micromirror devices in the micromirror array, the micromirror array can form various surface profiles. The control circuitry provides means to control surface profile of the micromirror array with minimum inputs. The control circuitry can be constructed by using known semiconductor microelectronics technologies such as MOS and CMOS.

Each micromirror in the micromirror array with non-fixed underlying structures is individually controlled. The micromirror in the micromirror array is independently controlled to form at least one optical surface profile. Also the micromirrors in the micromirror array are controlled by a common input signal to the electrodes to form an optical surface profile.

The micromirror array has a plurality of optical surface profiles to have a variable focusing property. The optical surface profile satisfies a phase matching condition, the optical surface profile satisfies a convergence condition. With satisfying the convergence and phase matching conditions, the micromirror array can be used as a variable focusing Micromirror Array Lens.

The micromirror array is used as an optical phase modulator. And the micromirror array can be used as a spatial light modulator. The micromirror array also forms a micromirror array lens, which is explained in the U.S. Pat. Nos. 6,934,072, 6,934,073, 6,972,284, 6,999,226, and 7,031,046 to Kim, U.S. Patents Pub. No. 2005/0264870 by Kim, No. 2006/0012852 by Cho, and U.S. patent application Ser. No. 11/191,886 by Cho in detail, all of which are hereby incorporated by references. The micromirror array forms a lens (micromirror array lens) by satisfying phase matching condition and convergence condition. Also the micromirror array can be used as an array of optical switch. Since every micromirror device in the micromirror array has a function of an optical switch, the whole micromirror array can be used as an array of optical switching devices.

The general principle, structure and methods for making the micromirror array devices and Micromirror Array Lens are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006 and U.S. patent application Ser. No. 11/685,119 filed Mar. 12, 2007 all of which are incorporated herein by references.

To have a function of a micromirror array lens, the micromirror array should satisfy two conditions to form a good lens. One is the convergence condition that every light should be converged into a focal point. The other is the phase matching condition that the phase of the converged light should be the same. In a conventional lens, the phase matching condition is that all the light passing through a lens should have the same optical path length to the focal point. However, micromirror array lens arranged in a flat surface uses the periodicity of the light to satisfy the phase matching condition. Since the same phase condition occurs periodically, the phase matching condition can be satisfied even though the optical path length is different. Each micromirror in the micromirror array lens can also be controlled independently to satisfy the phase matching condition and the convergence condition.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
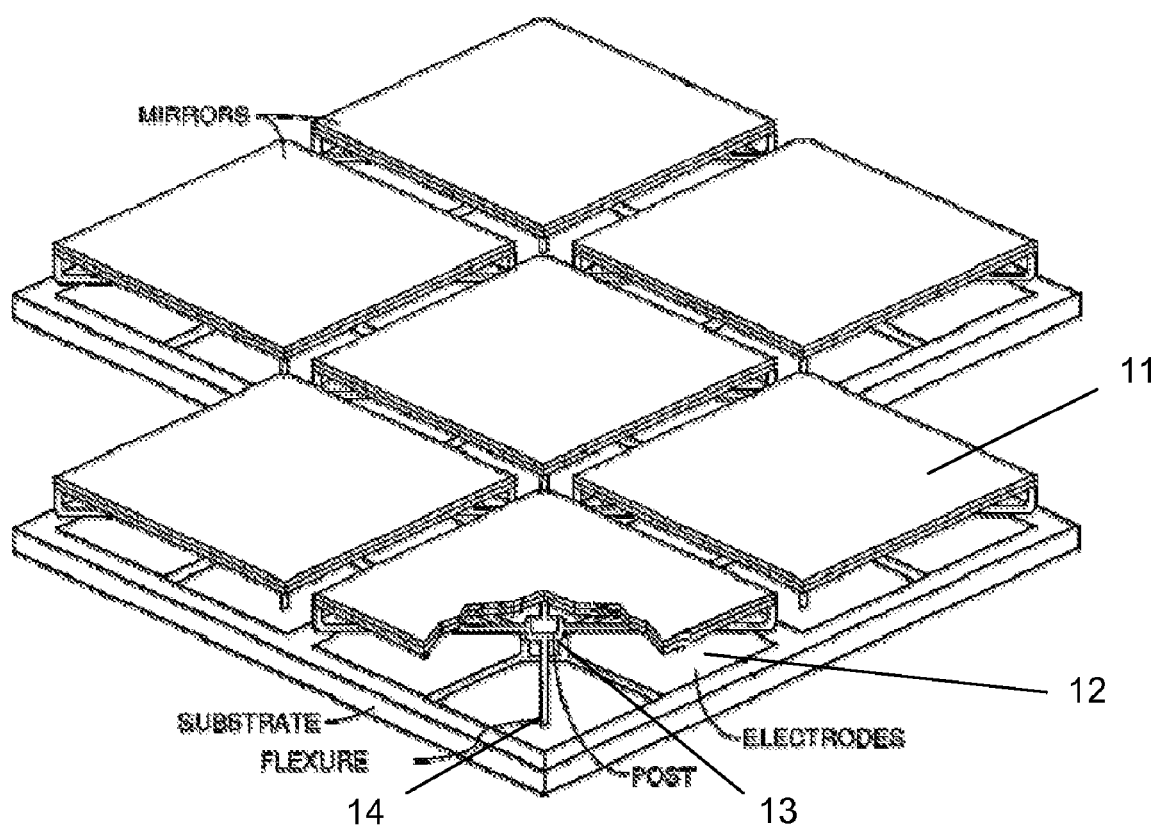
FIG. 1 is a perspective view of prior art showing an micromirror array with fixed underlying structures.

FIG. 1 shows the side-by-side array of the micromirror 11 in U.S. Pat. No. 6,028,689 to Michalicek, et al., entitled "Multi-Motion Micromirror". All underneath structures of electrodes 12, post 13, and flexures 14 are positioned beneath the micromirror so as to increase the fill factor to maximize the reflective area. Every micromirror 11 in the array has the same underlying structures and the structures are arranged in the same way. Each micromirror is controlled to have a specific motion with the voltage variations of the four underneath electrodes. With fixed underlying structure, the micromirrors 11 can be tilted and retracted according directly to varying potentials of four electrodes 12 to have motion variation in rotation and translation. The micromirror 11 can be tilted about two axes to scan one or more fields of regard and can simultaneously be retracted or elevated. When it comes to individual micromirror control with this micromirror structure, this structure cannot be controlled with simple control method and circuitry. Motion control voltages for every electrode in each micromirror in the array should be independently controlled and provided. But with non-fixed underlying structures, the present invention can have reduced control circuitry with simple control method and driving mechanism.

Figure 2:
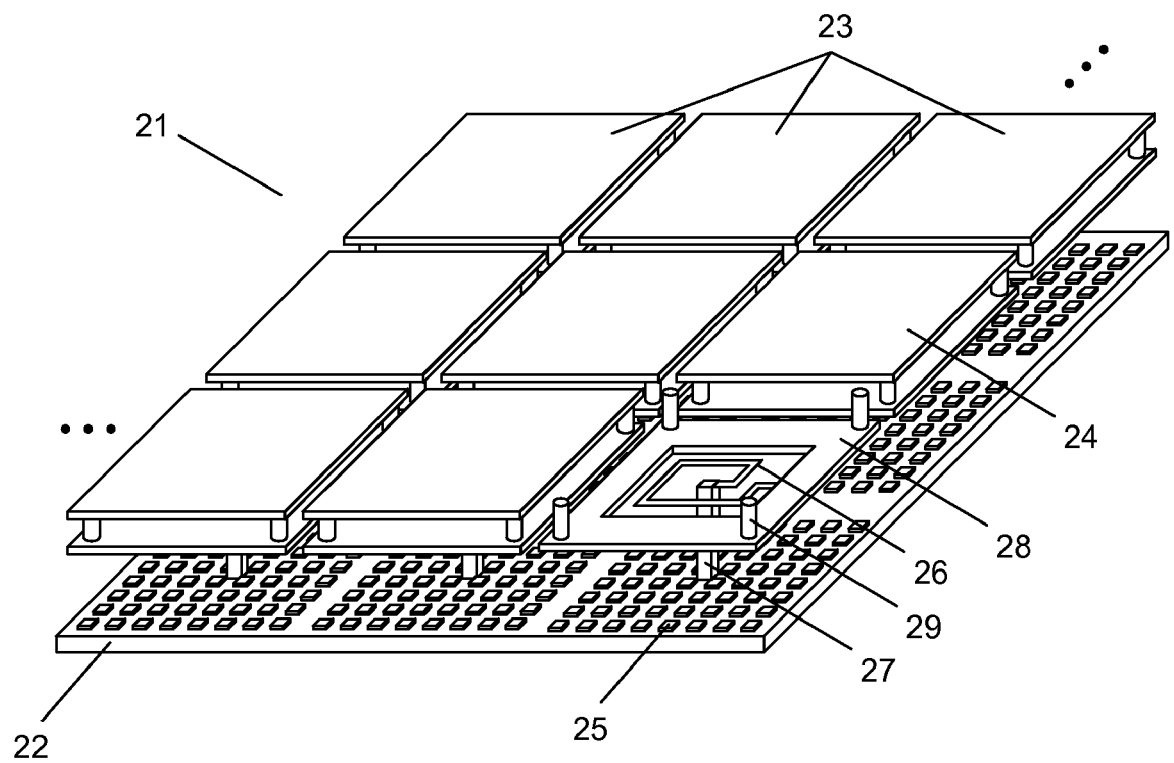
FIG. 2 is a schematic illustration showing a discretely controlled micromirror array device with fixed underlying structures of segmented electrodes.

FIG. 2 shows a schematic illustration of a discretely controlled micromirror array device 21 and the structures underneath a micromirror structure in the U.S. patent application Ser. No. 11/463,875. In this invention, each micromirror in the array can be controlled by applying voltage to the corresponding electrodes to have specific motions. A discretely controlled micromirror array device comprises a substrate 22 with a control circuitry (not shown) and a plurality of micromirrors 23 forming a micromirror array 21. Each micromirror 23 in the micromirror array 21 comprises a micromirror structure 24 having a reflective surface on one side, a plurality of segmented electrodes 25 disposed on the substrate surface and electronically coupled to the control circuitry for activating segmented electrodes 25 selectively, at least one flexible structure 26 for connecting the micromirror structure 24 and the substrate 22 and providing restoring force to the micromirror 23, and at least one pillar structure 27 for supporting the flexible structure 26 and providing connection between the substrate 22 and the flexible structure 26. The micromirror 23 further comprises at least one top electrode plate 28 disposed underneath the micromirror structure 24. The micromirrors 23 have multi-axis rotational and translational motions. The rotational and translational motions of each micromirror 23 are controlled to have a required position and orientation by selected set of activated segmented electrodes 25. The micromirrors 23 in the micromirror array 21 form at least one surface profile. The top electrode plate 28 increases the electrostatic force induced between the segmented electrodes 25 and the top electrode plate 28 by reducing the electrostatic gap between the electrodes and increasing the active area of electrodes. The structural deformation of the micromirror structure 24 is reduced by connecting the micromirror structure 24 to the top electrode plate 28 using at least one top electrode post 29. The motion of each micromirror 23 is controlled by appropriate in-plane positions and combinations of the segmented electrodes 25, and voltages applied to the corresponding segmented electrodes. Since all micromirrors 23 in the micromirror array 21 have the same fixed underlying structure, they have complicated structures and control circuitry for translational and multi-axis rotational motions. With this structure, the control method is much simpler than the case of FIG. 1, but still there should be a lot of control lines for individually control of each micromirror in the array. To have high controllability with simple control method is highly desirable. The present invention provides the high controllability of micromirrors in the array and simple control method.

Figure 3A:
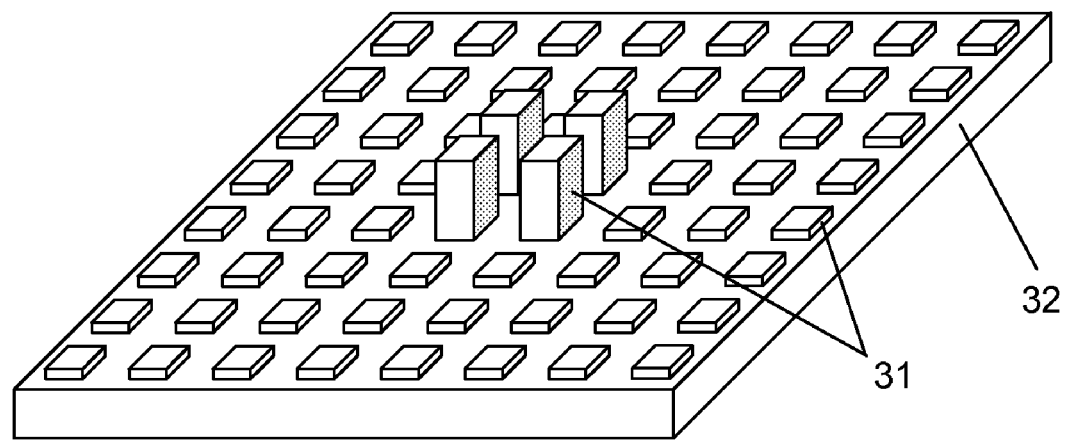
FIGS. 3a-3b are schematic illustrations showing variations in the height of segmented electrodes for a micromirror.
Figure 3B:
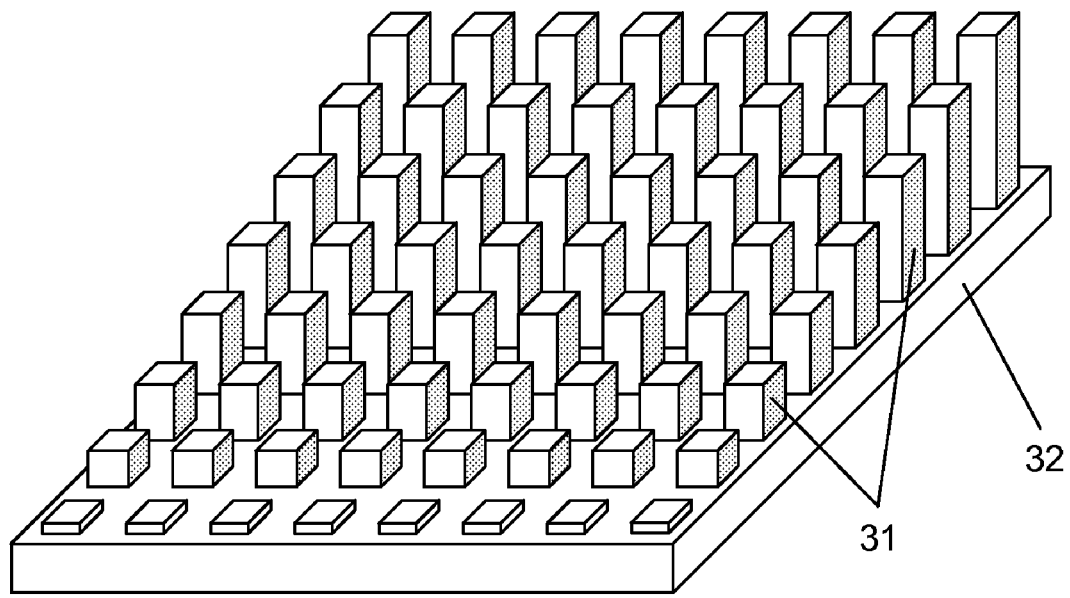

Although the segmented electrodes 25 can have a substantially identical shape and size as shown in FIG. 2, the segmented electrodes 25 can have a plurality of variations in size and shape depending on applications. The shapes and sizes of the segmented electrodes 25 can be varied in association with the shape and size of the micromirror structure 24 in order to increase the effective actuation area and prevent interference with adjacent micromirror structures. The segmented electrodes 31 also can have a plurality of variations in height from the substrate 32 as shown in FIG. 3. The figure shows schematic illustrations showing variations in the height of segmented electrodes 31 for a micromirror. The segmented electrodes 31 can have a plurality of variations in height from the substrate 32, wherein the height of each segmented electrode 31 is determined so that the induced electrostatic force is maximized without hindering the motion of the micromirror structure. FIG. 3a shows an example of variations in the height of segmented electrodes, where the segmented electrodes 31 proximal to the center of the micromirror is longer than those of the distal to the center of the micromirror. This configuration can be effectively used for the application requiring large rotations of the micromirror such as light switch. FIG. 3b shows another example of variations in the height of segmented electrodes, where the height of segmented electrodes 31 is gradually increased from one side to the other side. It should be noted that variations in height of the segmented electrodes 31 mentioned above are examples only, as many other variations in height of the segmented electrodes 31 could be used.

As in FIGS. 2 and 3, the motion of each micromirror 23 is controlled by appropriate combinations of sizes, heights, in-plane positions of the segmented electrodes, and voltages applied to the corresponding segmented electrodes. In order to generate translational and multi-axis rotational motions with the fixed underlying structure, the micromirrors have to comprise complicated structures and/or control methods.

Figure 4A:
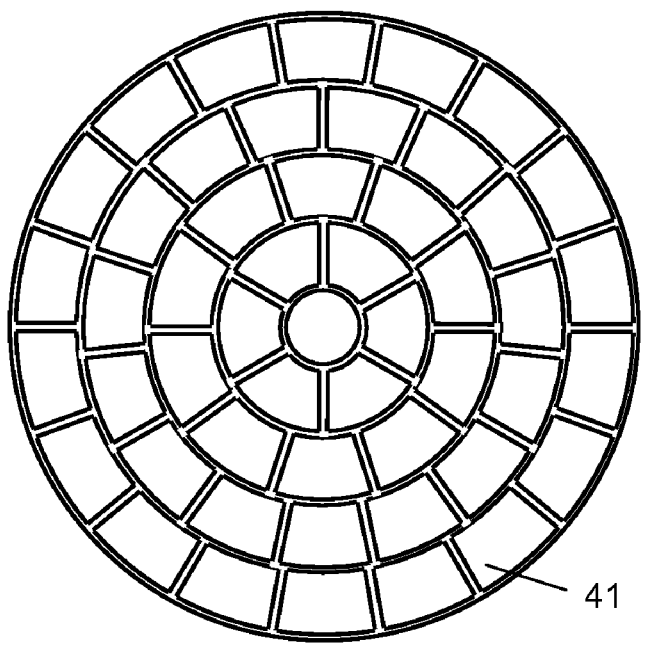
FIGS. 4a-4c are schematic diagrams showing examples of a polar array of fan shaped micromirrors (4a), and micromirror structure with fixed (4b) and non-fixed underlying structure (4c)
Figure 4B:
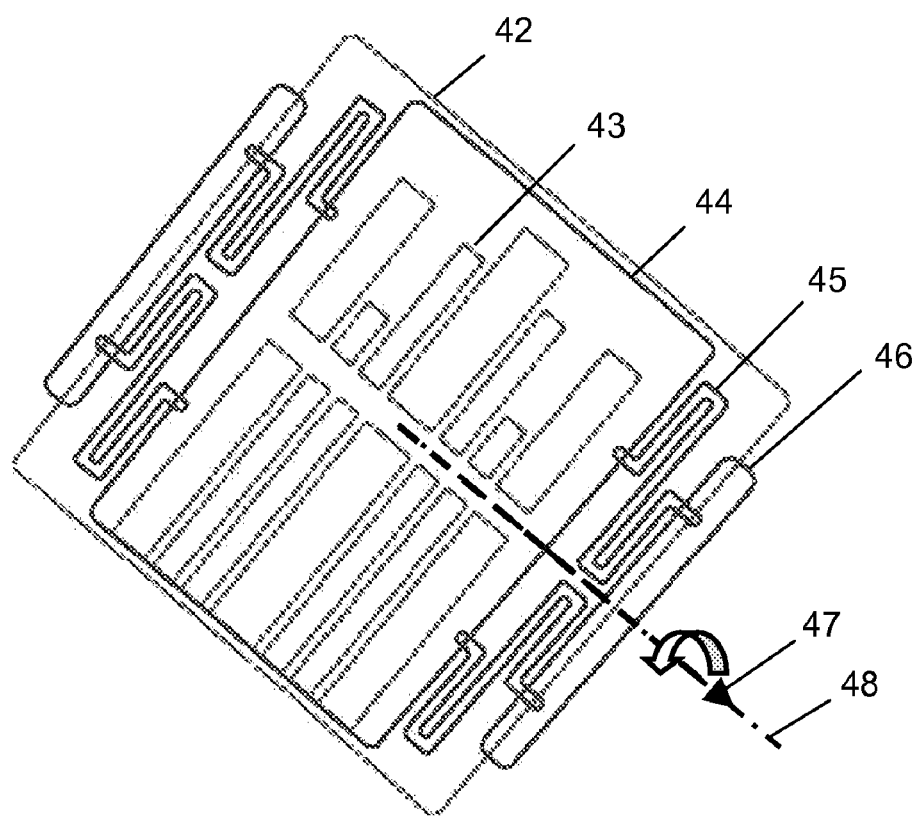
Figure 4C:
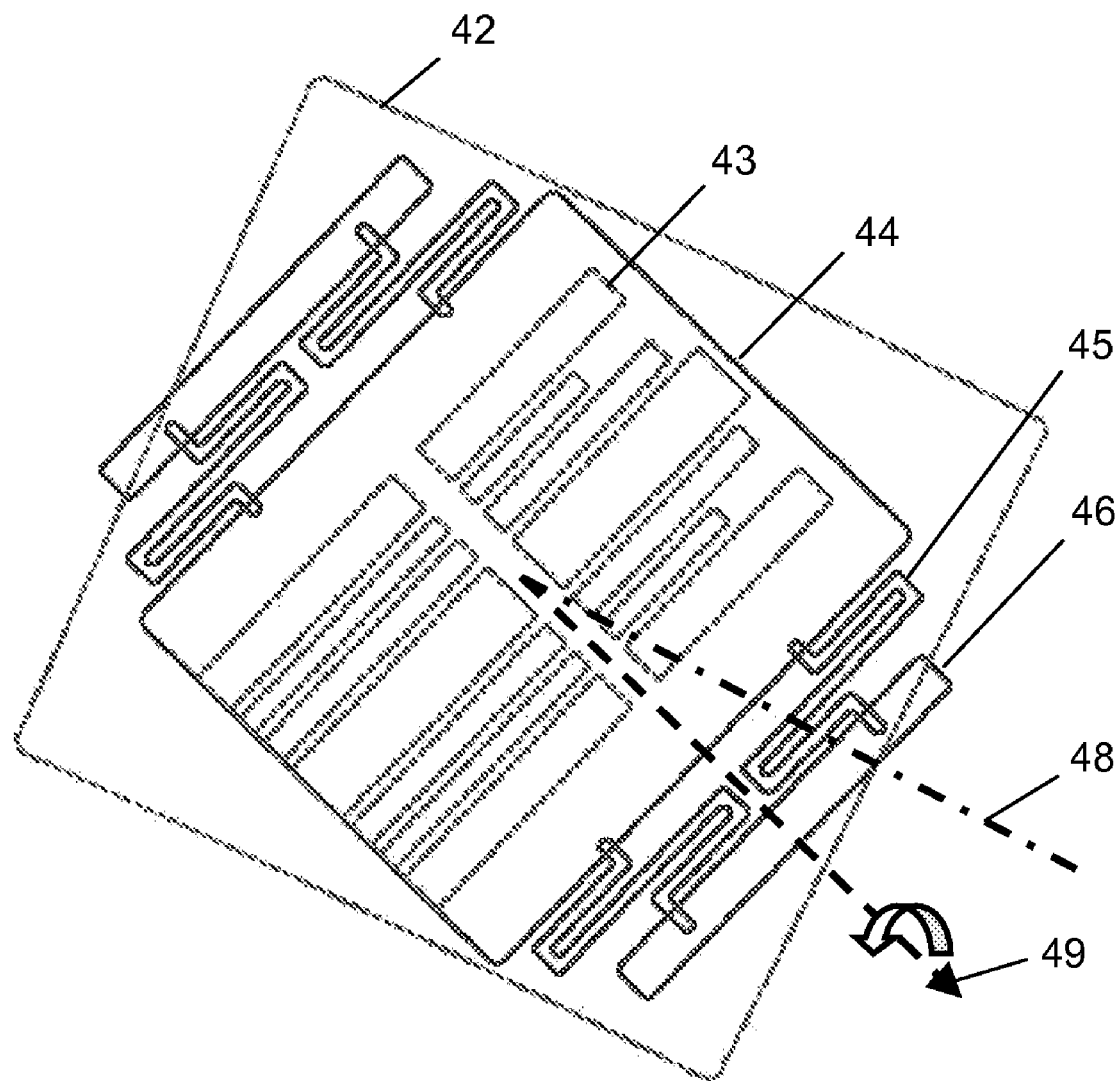

FIG. 4a shows an example of a polar array of micromirrors 41. The micromirrors in the array are arranged in polar geometry. Every micromirror is arranged in a circular way. The electrodes and the underlying structures are fixed with the micromirror arrangement of circular geometry. FIGS. 4b and 4c show the difference between the conventional micromirror with the same fixed underlying structure and the micromirror of the present invention with non-fixed underlying structures. The conventional micromirror with the same fixed underlying structure is shown in FIG. 4b. Every micromirror structures 42 have the same fixed underlying structures with respect to the micromirror structures. The rotation degrees of freedom are restricted with the arrangement of the micromirror. The underlying structures comprise bottom electrodes 43 to provide actuation force and control circuitry (not shown), a top electrode 44 electrically coupled with the bottom electrode 43 to provide actuation force, flexible structures 45 providing restoring force for micromirror motions and connected with the top electrode plate 44, pillar structure 46 supporting the flexible structure 45 from the substrate, and post structures (not shown) connecting the micromirror structure 42 and the top electrode 44.

If the micromirrors in FIG. 4b are arranged along with the concentric circles in polar array as in FIG. 4a and the micromirrors 41 in the same concentric circle are usually controlled by the common control input, those micromirrors 41 have the same motion. Then, the polar array can generate a spherical or aspherical surface profile only. With more complicated control circuitry and method, the polar array can generate more surface profiles if micromirrors are controlled independently with different control inputs. However, the polar array of micromirrors Oust as in FIG. 4b) has the limitation on motion control and can generate only axis-symmetric surface profiles with the rotation axis 47 which is always in the tangential direction 48 of the concentric circle.

Even with the same components of the underlying structure, the polar array can be designed for each micromirror as in FIG. 4c to have non-fixed underlying structure which can be oriented to have principal rotational axis 49 other than the tangential direction of the concentric circle of the polar array. The micromirrors have no structural and mechanical interference in motion. Also electrical conflict is avoided. Since there is no more limitation on orientation of the underlying structure and the direction of principal axis, the polar micromirror array in the present invention can reproduce various surfaces including spherical, aspherical (e.g. parabolic, hyperbolic, elliptical, etc.), anamorphic other than rotational symmetrized micromirror array. The micromirrors in the polar array can also be controlled by the common control input or controlled independently by different control inputs. Although each micromirror has the same control input, the micromirrors has different rotational axis with the different amounts of principal rotation angle.

The present invention can have one or more top electrode plates 44 in the same layer as flexible structures 45. The top electrode plate 44 can be designed to minimize the out-of-plane dimension and maximize the motion efficiency and diversity. If the micromirror structure is attracted by the actuation force, the change in principal rotation angle is not flexible while designing the micromirrors in the array. Without any change for the micromirror structure 42, the top electrode plate 44 gives the flexibility for the structural variations, thus the freedom for principal axis of the micromirror structures. The other important role of the top electrode plate 44 is to provide structural stability for the micromirror structure. By connecting the micromirror structure 42 and the top electrode plate 44 with post structures (not shown), the deformation of the micromirror structure 42 can be prevented or reduced. The micromirror 41 is controlled electrostatically by applying control voltages to the actuating components such as bottom electrodes 43 and top electrode 44. All the mechanical structures and the actuating components are positioned under the micromirror structure 42 in order to maximize the fill factor of the micromirror thus effective reflective area.

Another advantage of the top electrode is control voltage of the micromirror device. No matter how big the upper dimension above the top electrode layer is, there is no difference in applied voltage because the electrostatic force only dependent on the potential difference and the gap between the bottom electrode 43 and the top electrodes 44. Thanks to the top electrode of the micromirror structure, the structural design flexibility can be obtained. Therefore, other necessary structures can be easily added or modified without increasing the gap between the electrodes 43, 44, thus without change in operational voltage of the micromirror device.

With top electrode structure, some additional structures can be added to provide better structural stability, to prevent the stiction problems which might occur, or to solve other problems for fabrication and operation of the micromirror array device. Also since the electrostatic actuation force is mainly dependent on the gap between electrodes and the common area of two electrode planes with different potential, the electrostatic actuation force can be increased by increasing the acting electrode areas.

The micromirror structure 42 has a reflective surface (not shown) to increase the reflectivity of the micromirror. The reflective surface of the micromirror structure 42 is substantially flat. In some cases, the reflective surface of the micromirror structure 42 preferably has a curvature in order to enhance the optical properties of the surface profile of the micromirror or micromirror array. The curvature of the micromirror structure 42 is also controlled to enhance the optical properties of the micromirror or micromirror array. The curvature of the micromirror structure 42 is controlled by electrothermal force.

Figure 5A:
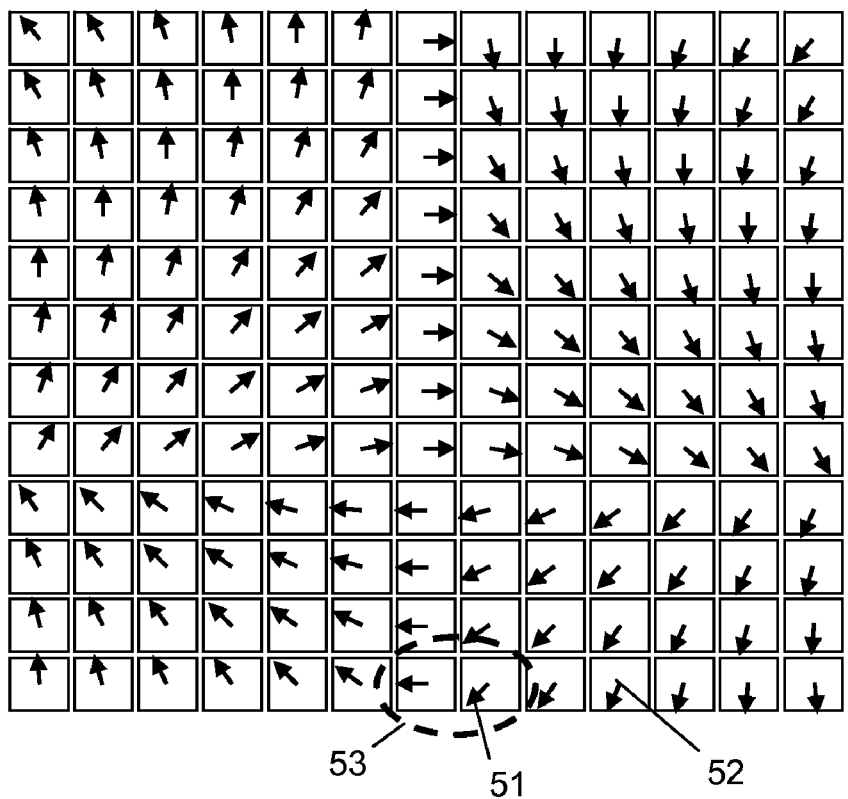
FIGS. 5a-5d are diagrams of principal axes of a square micromirror array for a desired surface profile, and two dimensional and three dimensional micromirror structures with different orientations of non-fixed underlying structures.
Figure 5B:
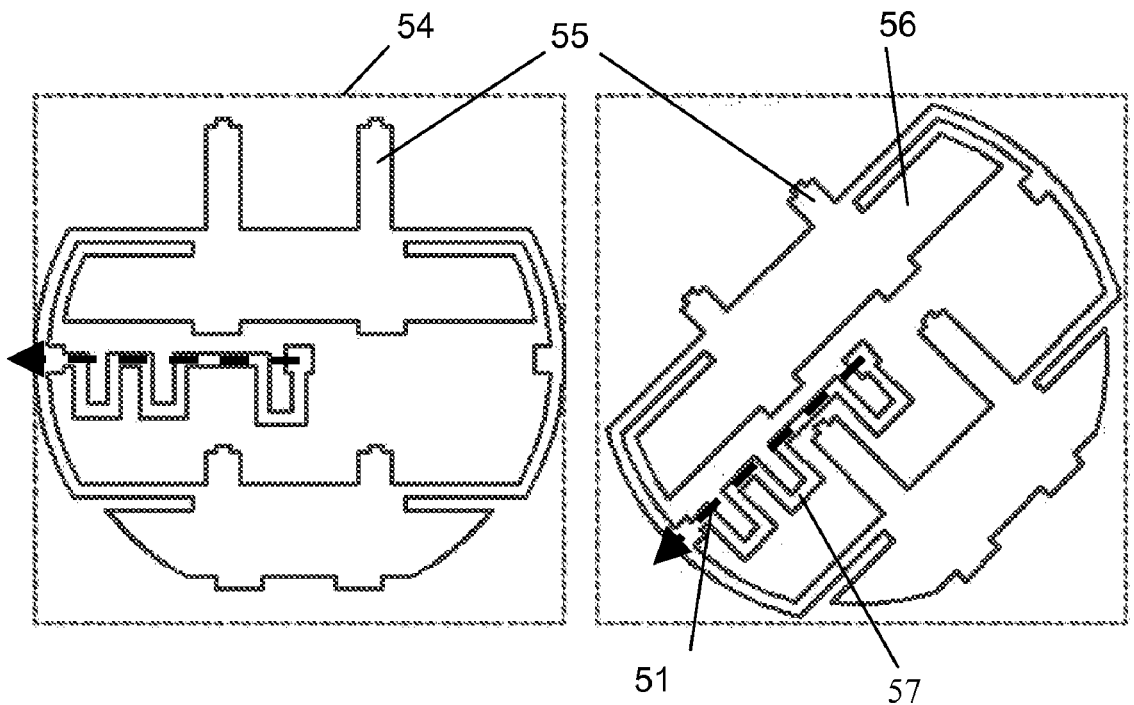

FIG. 5a is a schematic diagram of quiver plot for principal axes 51 of micromirrors 52 in a square array for a desired surface profile for example. Each arrow denotes the direction of the principal axis 51 of each micromirror 52. The desired optical profile can be reproduced by a single principal rotation about the principal axis 51 and the desired translation (not shown). As a part of array in the dotted area 53, the in-plane underlying structures of two micromirrors are shown in FIG. 5b. For simplicity, FIG. 5b shows only two layers; one layer for the micromirror structure 54 and the other layer for structures with supports 55, stepper plates 56, and flexible structures 57. The principal axes 51 are also denoted by dashed arrows.

Figure 5C:
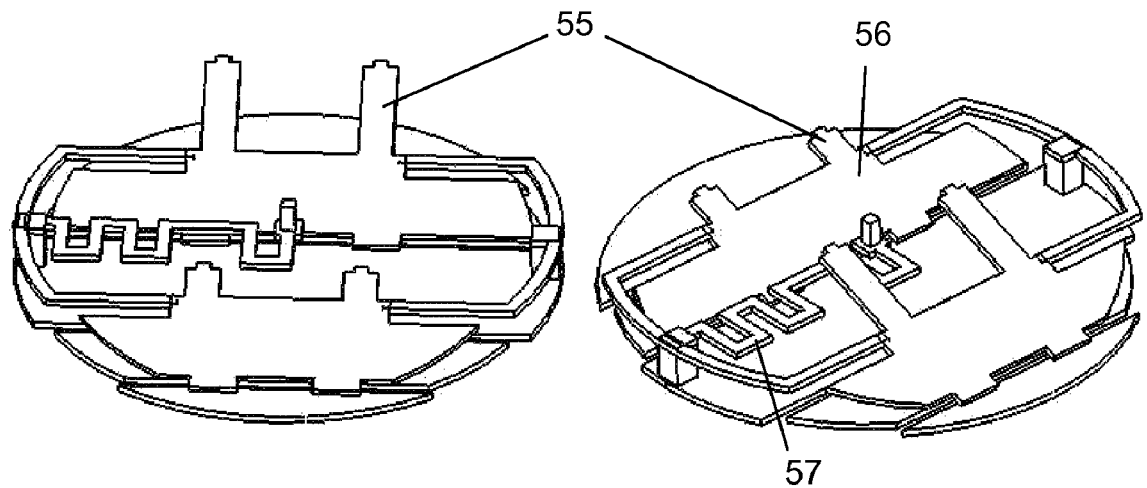
Figure 5D:
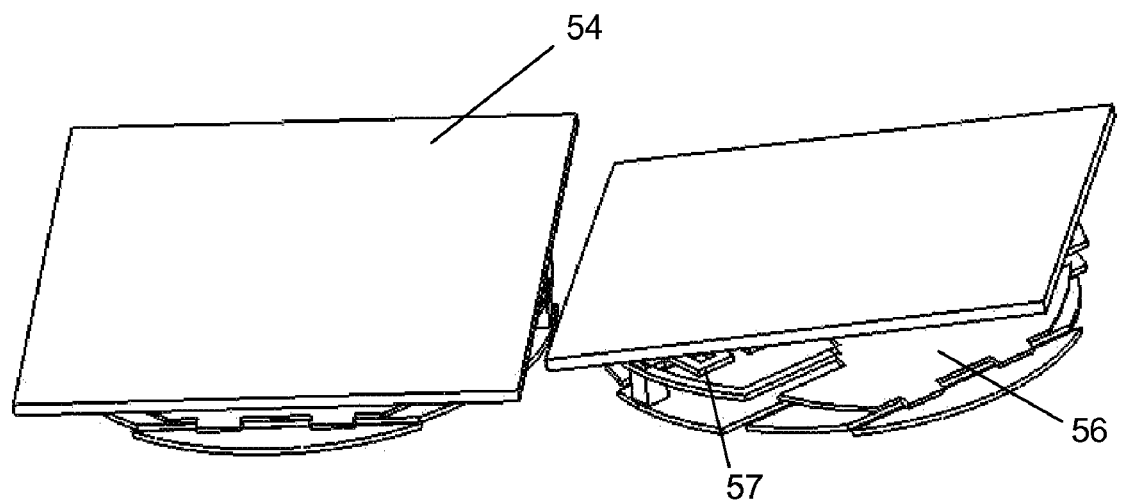

With other necessary structures except for the micromirror structure, the three-dimensional underlying structures of the same micromirrors are shown in FIG. 5c with different orientations according to the direction of principal axes. The stepper plates 56 and the supports 55 make the contact points with the micromirror structure 54. The supports 55 uphold the micromirror structure 54 with the desired motion. The square micromirror structures 54 are added to the underlying structures in FIG. 5c. The motion of the micromirror, that is the position and the orientation of the micromirror structure 54, can be determined by the length of the supports 55 and rotation angles of the stepper plates 56.

Figure 6A:
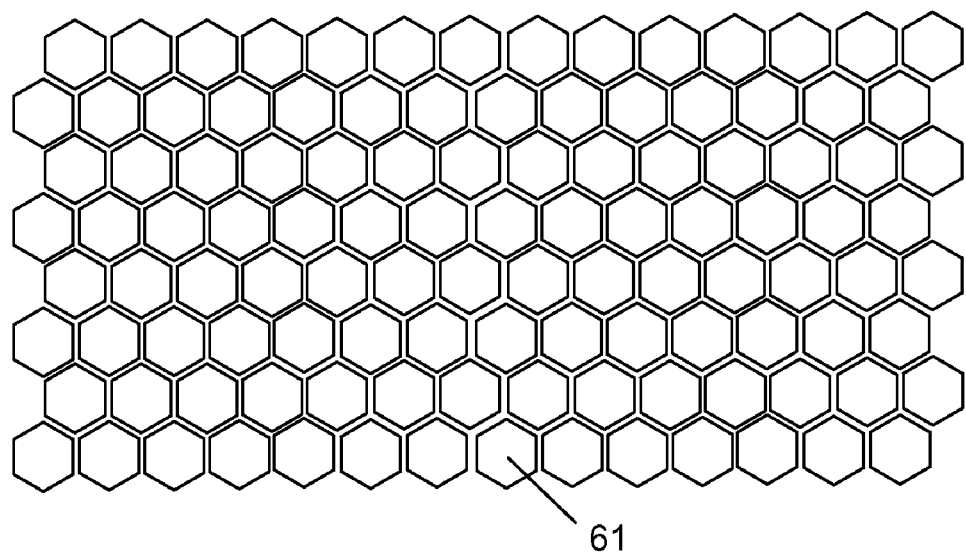
FIGS. 6a-6c are schematic diagrams showing an example of hexagonal micromirror array and micromirror structures with different orientations of non-fixed underlying structures.
Figure 6B:
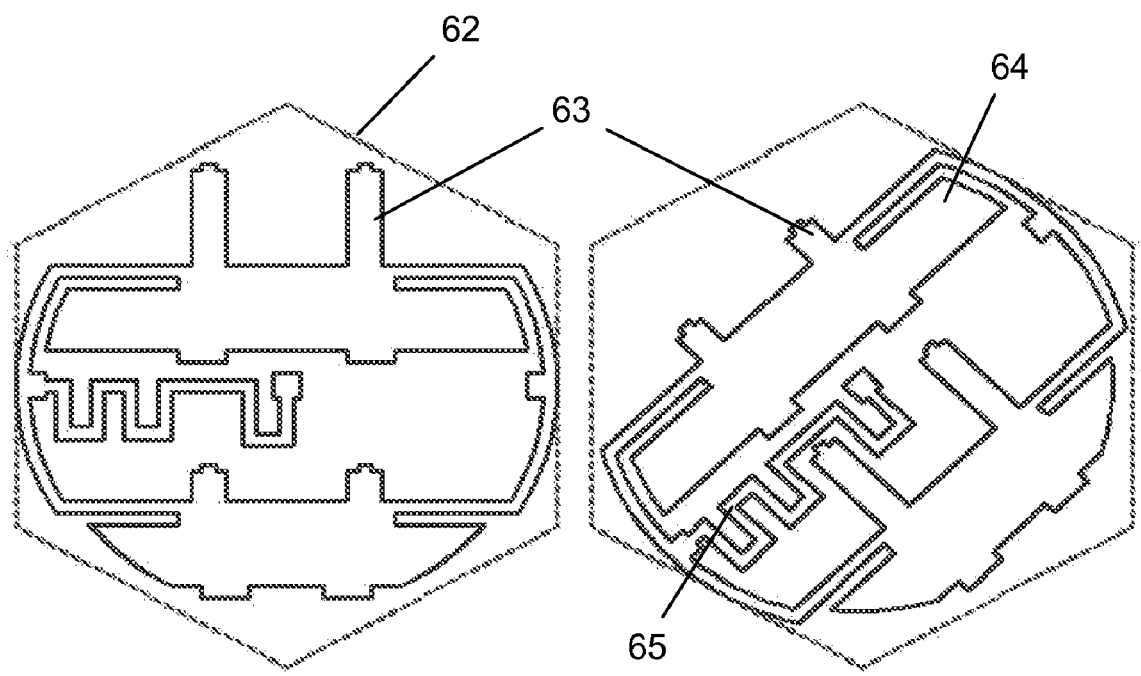
Figure 6C:
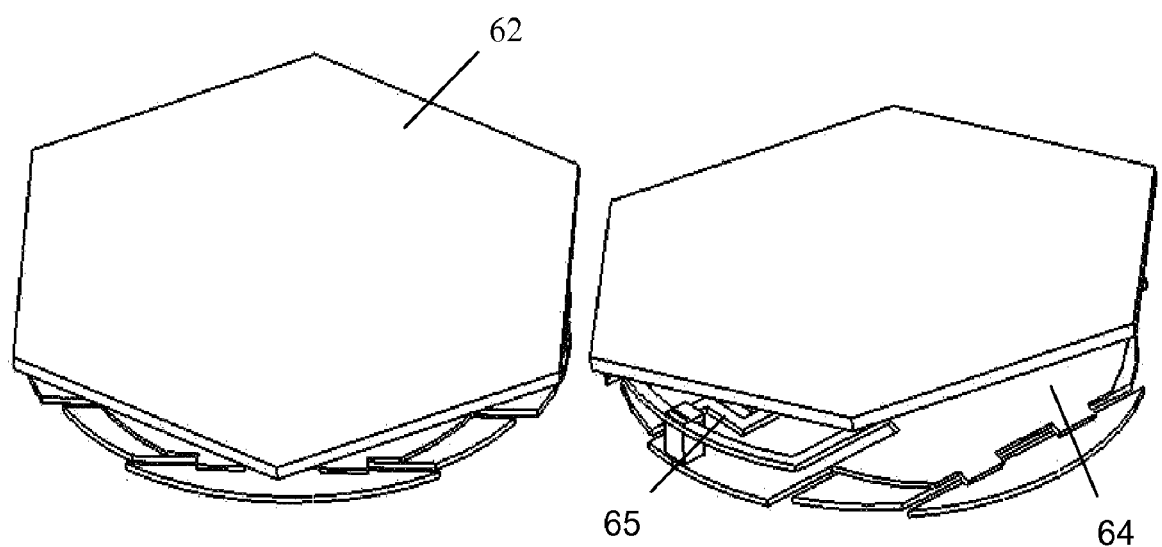

FIG. 6a shows another example of the micromirror array with hexagonal micromirrors 61 having the same kinds of non-fixed underlying structures as explained in FIGS. 5a-5d. As a part of array, FIG. 6b shows the in-plane structures of two micromirrors with hexagonal micromirror structures 62 and other underlying structures such as supports 63, stepper plates 64, and flexible structures 65 which are the same as FIG. 6b. The hexagonal micromirror structures 62 are added to the underlying structures and shown in three-dimensional view in FIG. 6c. The shape of the micromirror is determined by the application of the micromirror array and the geometry of the optical system that the micromirror array is applied.

The micromirror structure has a reflective surface to increase the reflectivity of the micromirror. The reflective surface of the micromirror structure is made of metal, metal compound, multi-layered dielectric material, or other materials with high reflectivity. Many known micro fabrication processes can be applied to make the reflective surface have a high reflectivity.

The reflective surface of the micromirror structure is substantially flat. In some cases, the reflective surface of the micromirror structure preferably has a curvature in order to enhance the optical properties of the surface profile of the micromirror or micromirror array. The curvature of the micromirror structure is also controlled for enhancing the optical properties of the micromirror or micromirror array. The curvature of the micromirror structure is controlled by electrothermal force.

The present invention can have one or more top electrode plates in the same layer as flexible structures. The top electrode plate can be designed to minimize the out-of-plane dimension and maximize the motion efficiency and diversity. Without any change for the micromirror structure, the top electrode plate gives the flexibility for the structural variations, thus the freedom for principal axis of the micromirror structures. Another important role of the top electrode plate is to provide structural stability for the micromirror structure. By connecting the micromirror structure and the top electrode plate with post structures (not shown), the deformation of the micromirror structure can be prevented or reduced. The micromirror is controlled electrostatically by applying control voltages to the actuating components such as bottom electrodes and top electrode. All the mechanical structures and the actuating components are positioned under the micromirror structure in order to maximize the fill factor of the micromirror thus effective reflective area.

Another advantage of the top electrode is control voltage of the micromirror device. No matter how big the upper dimension above the top electrode layer is, there is no difference in applied voltage because the electrostatic force only dependent on the potential difference and the gap between the bottom electrode and the top electrodes. Thanks to the top electrode of the micromirror structure, the structural design flexibility can be obtained. Therefore, other necessary structures can be easily added or modified without increasing the gap between the electrodes, thus without change in operational voltage of the micromirror device.

With top electrode structure, some additional structures can be added to provide better structural stability, to prevent the stiction problems which might occur, or to solve other problems for fabrication and operation of the micromirror array device. Also since the electrostatic actuation force is mainly dependent on the gap between electrodes and the common area of two electrode planes with different potential, the electrostatic actuation force can be increased by increasing the acting electrode areas.

Figure 7:
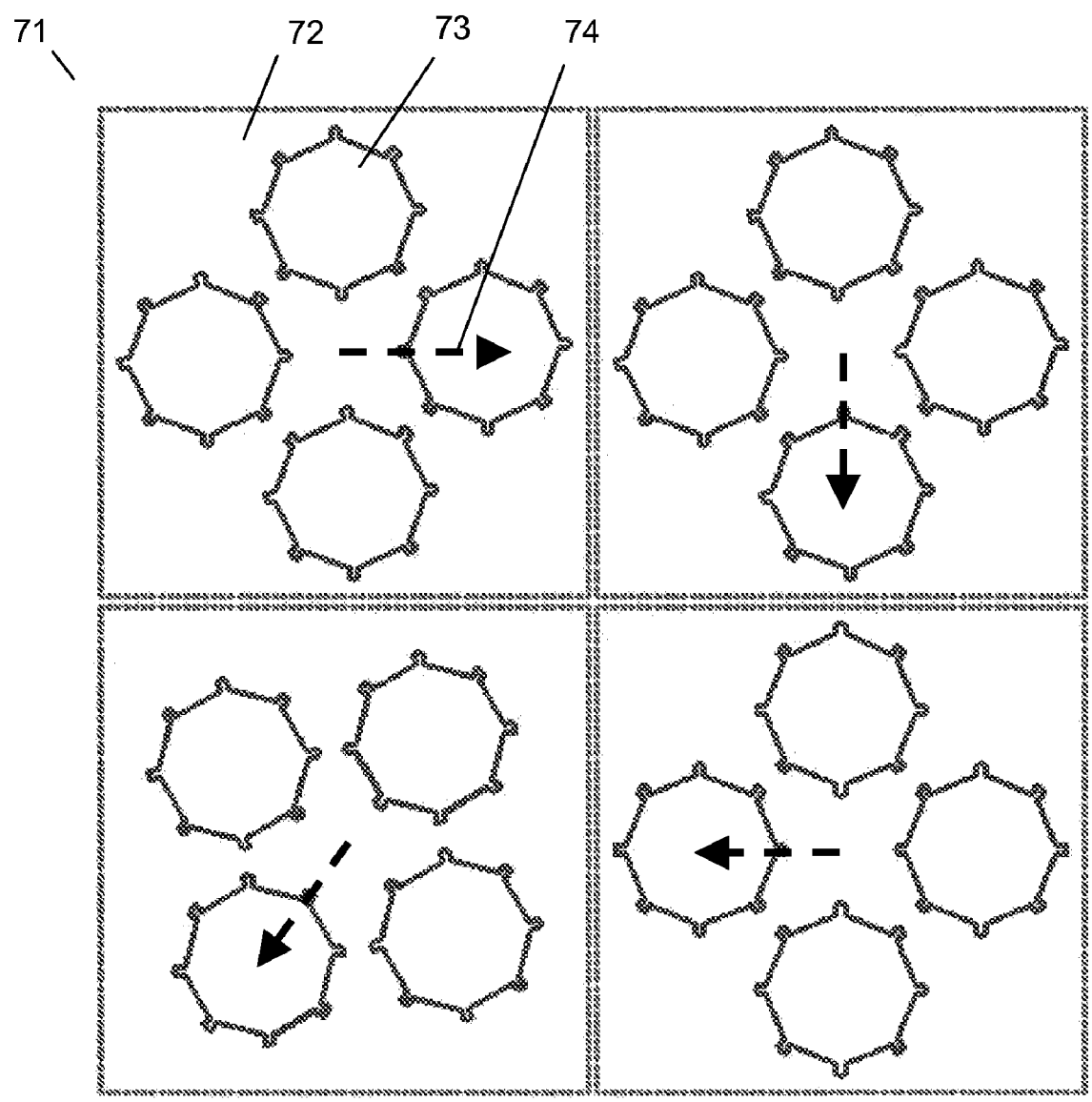
FIG. 7 is a schematic diagram showing square micromirror structures in a micromirror array with non-fixed underlying structures oriented along with principal axes.

In FIG. 7, the square micromirror array 71 has micromirrors 72 with different orientations of the underlying structures. Only two-dimensional in-plane structures of micromirrors 72 and the stepper plates 73 are shown along with principal axes 74 in FIG. 7. Other underlying structures strongly coupled with the stepper plates which have a major role in motion control. As mentioned and fully explained in the U.S. patent application Ser. No. 11/369,797 filed Mar. 6, 2006 and U.S. patent application Ser. No. 11/685,119 filed Mar. 12, 2007, the multi-degrees of freedom motion of the micromirror 72 can be generated when the stepper plates rotate with support structures (not shown) on the stepper plates 73 contacting to the micromirror 72 or when the support structures (not shown) rest on the rotated stepper plates 73.

The micromirrors 72 can be controlled with the same common control input or controlled independently by the control circuitry. The control circuitry can be built by known semiconductor microelectronics technologies such as MOS or CMOS. Every micromirror in the micromirror array with fixed underlying structures should have the full motion coverage of the all the micromirrors to represent the optical surface profile since all the micromirrors have the same underlying structures, each micromirror should have the full motional coverage with the same amounts of translation and rotation. Only with full coverage of the motion, the micromirror array of micromirrors with the same fixed underlying structures can generate the desired surface profiles. Then, the structure has small motional coverage, since every micromirror should have full coverage. But in the present invention, the micromirror array 71 using micromirrors 72 with non-fixed underlying structure can have much larger motional coverage because each micromirror only needs to cover motional range relative to its own principal axis 74 not fully coverage of the motion.

Figure 8A:
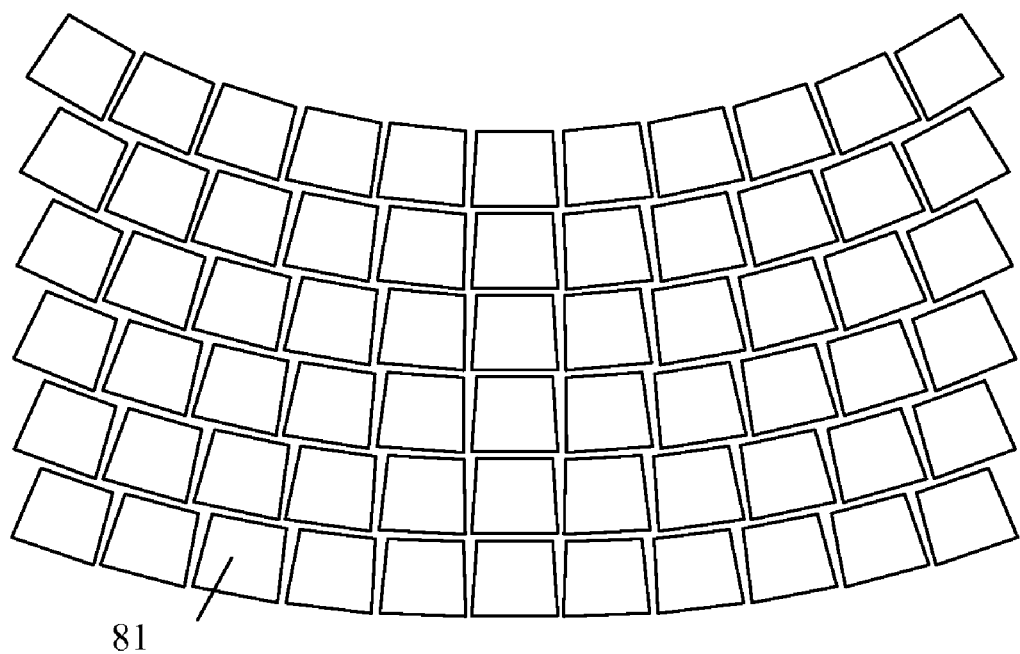
FIGS. 8a-8c are schematic diagrams showing examples for micromirror arrays with various arrangements and shapes of the micromirrors.
Figure 8B:
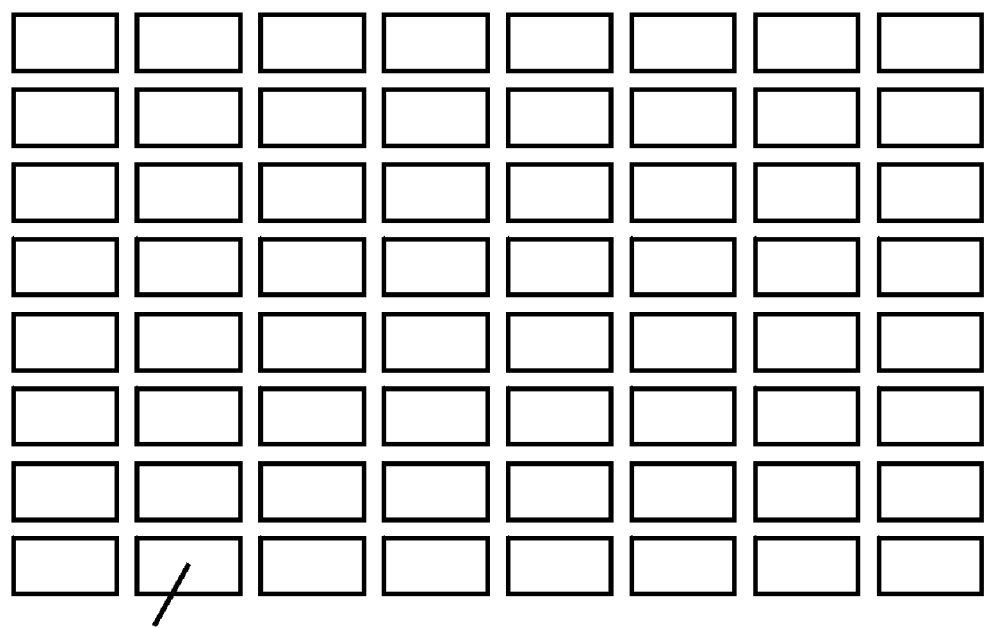
Figure 8C:
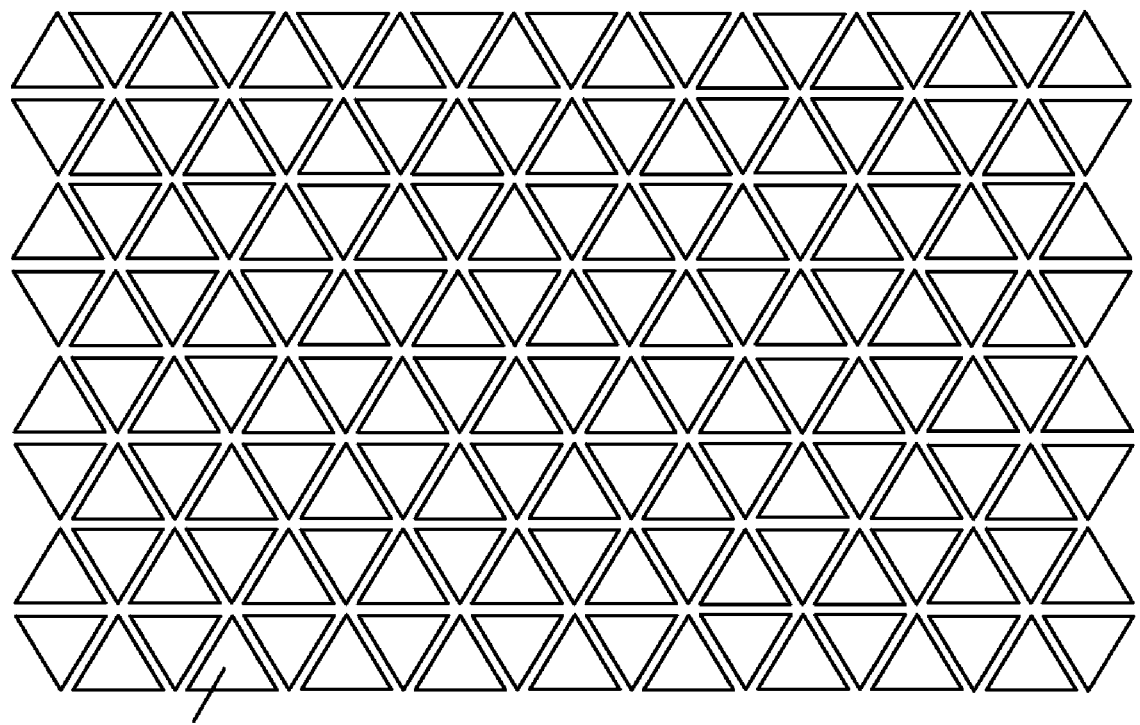

FIGS. 8a-8c show some other examples of various arrays of different micromirrors. To build a micromirror array, the micromirrors should be arranged side-by-side. To represent a rotational symmetric Micromirror Array Lens or a rotational symmetric micromirror array, it would be better for the micromirrors to be arranged in a polar array just like in FIG. 4a. Also the preferable shape of the micromirror device is a fan shape for the case of polar array. Each of the micromirrors has a fan shape to increase an effective area of reflection, which increases optical efficiency. The micromirrors are arranged to form one or more concentric circles to form a rotational symmetric Micromirror Array Lens or a rotational symmetric micromirror array. The micromirrors on the same concentric circle in the rotational symmetric array can be controlled by the same control input or independently controlled. As shown in FIGS. 4, 5, 6, and 8, the micromirrors can have various shapes such as a fan shape, a hexagonal shape, a rectangular shape, a square shape, a triangular shape, mixed shapes, etc. The shape of the micromirror 81 is determined by the application of the micromirror array device and the geometry of the optical system that the micromirror array device is applied. Preferably, the micromirrors 81 are arranged depending on the geometry of the optical system to have better optical performance. It should be noted that the arrangements of the micromirrors 81 mentioned above are examples only. The sizes and shapes of the micromirrors 81 or micromirror array should be determined depending on the applications and the geometry of the optical system.

The underlying structures of the micromirrors 81 are not fixed and have different orientations to generate the desired surface profile with specific translational motion and single principal rotation. Each micromirror 81 of the micromirror array is electrostatically or electromagnetically controlled. A group of micromirrors 81 can be controlled by common control input or independently controlled using the control circuitry. The control circuitry can be built by known semiconductor microelectronics technologies such as MOS or CMOS. Applying the microelectronics circuitry under micromirror array, the effective area of reflection can be increased.

The micromirror array in the present invention can reproduce various surfaces including, but not limited to, spherical, aspherical (e.g. parabolic, hyperbolic, elliptical, etc.), anamorphic, and non-axis-symmetric profiles.

By forming a specific and variable optical surface profiles, the micromirror array of the present invention can also be used as a spatial light modulator. Each micromirror in the micromirror array can be controlled independently. And the micromirrors in the micromirror array are controlled by a common input signal to form a surface profile. With different optical surface profiles, the micromirror array modulates the input light.

Micromirror Array Lens is a good example of the usage of the micromirror array. To have a function of a Micromirror Array Lens, the optical profile of the micromirror array should satisfy two conditions to form a good lens. One is the convergence condition that every light from a point of the object should be converged into a point of the focal plane. And the other is the phase matching condition that the phase of the converged light should be the same. In a conventional lens, the phase matching condition is that all the light passing through a lens should have the same optical path length to the focal point. But Micromirror Array Lens arranged in a flat surface uses the periodicity of the light to satisfy the phase matching condition. Since the same phase condition occurs periodically, the phase matching condition can be satisfied even though the optical path length is different. Each micromirror in the Micromirror Array Lens can be controlled independently to satisfy the phase matching condition and the convergence condition. Only after satisfying the convergence and phase matching conditions, the micromirror array can perform its function as a lens.

While the invention has been shown and described with reference to different embodiments thereof, it will be appreciated by those skills in the art that variations in form, details, compositions, and operation may be made without departing from the spirit and scope of the invention as defined by the accompanying claims.

What is claimed is:

1. An array of micromirrors with non-fixed underlying structures having a plurality of micromirrors comprising:
    a) a bottom layer having control circuitry;
    b) a micromirror having a top side and a bottom side, wherein the top side has a reflective surface; and
    c) underlying structures for providing actuation force and restoration force for motion of the micromirror and generating the micromirror motions;

wherein the underlying structures are aligned with a principal rotation of the micromirror motion and wherein the underlying structures comprise:
    a) at least one bottom electrode to provide electrostatic actuation force;
    b) at least one flexible structure to provide restoration force for the micromirror; and
    c) at least one post structure connecting and supporting the underlying structures and the micromirror;

wherein the underlying structures of each micromirror is individually oriented and aligned during fabrication process to generate a single principal rotational motion for forming a desired surface profile.

2. The array of micromirrors with non-fixed underlying structures of claim 1, wherein each micromirror in the array of micromirrors individually generate a micromirror motion with translation and a single principal rotation.

3. The array of micromirrors with non-fixed underlying structures of claim 2, wherein the micromirrors in the array of micromirrors have two degrees of freedom rotational motion and on degree of freedom translational motion described by the single principal rotational motion, orientation of the underlying structures with the micromirror, and translational motion of the micromirror.

4. The array of micromirrors with non-fixed underlying structures of claim 1, wherein the micromirrors in the array of micromirrors have two degrees of freedom rotational motion described by the single principal rotational motion and orientation of the underlying structures with the micromirror.

5. The array of micromirrors with non-fixed underlying structures of claim 1, wherein each micromirror in the array of micromirrors is individually controlled.

6. The array of micromirrors with non-fixed underlying structures of claim 1, wherein each micromirror in the array of micromirrors is independently controlled to form at least one optical surface profile.

7. The array of micromirrors with non-fixed underlying structures of claim 6, wherein the micromirrors in the array of micromirrors are controlled by a common input signal to the electrodes to form an optical surface profile.

8. The array of micromirrors with non-fixed underlying structures of claim 6, wherein the array of micromirrors has a plurality of optical surface profiles to have a variable focusing property.

9. The array of micromirrors with non-fixed underlying structures of claim 6, wherein the optical surface profile satisfies a phase matching condition.

10. The array of micromirrors with non-fixed underlying structures of claim 6, wherein the optical surface profile satisfies a convergence condition.

11. The array of micromirrors with non-fixed underlying structures of claim 1, wherein the array of micromirrors is used as an optical phase modulator.

12. The array of micromirrors with non-fixed underlying structures of claim 1, wherein the array of micromirrors is used as a spatial light modulator.

13. The array of micromirrors with non-fixed underlying structures of claim 1, wherein the array of micromirrors is used as a variable focusing Micromirror Array Lens.

14. The array of micromirrors with non-fixed underlying structures of claim 1, wherein the reflective surface of each micromirror has a metal layer.

15. The array of micromirrors with non-fixed underlying structures of claim 14, wherein the metal layer is made of a material selected from the group consisting of silver (Ag), aluminum (Al), gold (Au), nickel (Ni), chromium (Cr), and platinum (Pt) to have high reflectivity.

16. The array of micromirrors with non-fixed underlying structures of claim 14, wherein the metal layer is protected by additional coating layer deposited on the metal layer with a material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), calcium fluoride ($CaF_2$), zinc sulfide (ZnS), zinc selenide (ZnSe), polycarbonate, polyester, polyethylene naphthalate, and fluoropolymer.

17. The array of micromirrors with non-fixed underlying structures of claim 14, wherein the reflectivity of the metal layer is enhanced by dielectric coating layers.

18. The array of micromirrors with non-fixed underlying structures of claim 1, wherein the reflective surface of each micromirror has dielectric layers.

19. The array of micromirrors with non-fixed underlying structures of claim 1, wherein the reflective surface of the micromirror is substantially flat.

20. The array of micromirrors with non-fixed underlying structures of claim 1, wherein the reflective surface of the micromirror has a curvature.

21. The array of micromirrors with non-fixed underlying structures of claim 1, wherein the curvature of the micromirror is controlled.

22. The array of micromirrors with non-fixed underlying structures of claim 1, wherein the underlying structures further comprise at least one stepper plate disposed between the micromirror and the bottom layer, wherein the stepper plate defines the motion of the micromirror.

23. The array of micromirrors with non-fixed underlying structures of claim 22, wherein each stepper plate has at least one support structure wherein the motion of the micromirror is pre-programmed by positions of the stepper plate and the supports.

* * * * *